United States Patent [19]

Ide

[11] Patent Number: 5,007,491

[45] Date of Patent: Apr. 16, 1991

[54] DOWNHOLE DRILLING APPARATUS PROGRESSIVE CAVITY DRIVE TRAIN WITH SEALED COUPLING

[76] Inventor: Russell D. Ide, P.O. Box 744, 641 Arnold Rd., Coventry, R.I. 02816

[21] Appl. No.: 540,692

[22] Filed: Jun. 20, 1990

[51] Int. Cl.$^5$ .................. E21B 4/02; F01C 1/10; F16D 3/02; F16D 3/16

[52] U.S. Cl. .................. 175/107; 418/48; 418/182; 464/19; 464/147; 464/136

[58] Field of Search .......... 175/107, 101; 418/48, 418/182; 464/136, 19, 147, 172, 134

[56] References Cited

U.S. PATENT DOCUMENTS

| | | | |
|---|---|---|---|
| 3,986,370 | 10/1976 | Garrison | 175/107 X |
| 3,999,901 | 12/1976 | Tschirky | 175/107 X |
| 4,080,115 | 3/1978 | Sims et al. | 175/107 X |
| 4,263,788 | 4/1981 | Beimgraben | 464/19 X |
| 4,449,953 | 5/1984 | Nikomarov et al. | 464/19 |
| 4,679,638 | 7/1987 | Eppink | 464/19 |
| 4,844,180 | 7/1989 | Zijsling | 175/107 |

Primary Examiner—Stephen J. Novosad
Attorney, Agent, or Firm—Marks Murase & White

[57] ABSTRACT

A downhole drilling apparatus which includes a progressive cavity drive train having a progressive cavity device and a coupling for converting the complex motion of the rotor into simple rotation. The coupling is constructed along the lines of a double Hooke's joint. Each joint includes two transversely arranged pins which pivot within a torsion member. The pins are supported for rotation with a bore formed in the torsion member on a plurality of rollers. An elastomer encases the rollers and fills the remaining spaces between the pin and torsion members such that all sliding surfaces within the coupling are perfectly isolated from the surrounding environment and thereby hermetically sealed.

12 Claims, 3 Drawing Sheets

DOWNHOLE DRILLING APPARATUS PROGRESSIVE CAVITY DRIVE TRAIN WITH SEALED COUPLING

BACKGROUND OF THE INVENTION

This invention relates to a progressive cavity apparatus, and more particularly to drive trains for progressive cavity downhole drilling devices.

The use of progressive cavity or single-screw rotary devices is well known in the art, both as pumps and as driving motors. These devices have a single shaft in the shape of one or more helix contained within the cavity of a flexible lining of a housing. The generating axis of the helix constitutes the true center of the shaft. This true center of the shaft coincides with its lathe or machine center. Typically, the lined cavity is in the shape of a two or more helices (one more helix than the shaft) with twice the pitch length of the shaft helix. Either the shaft or the housing is secured to prevent rotation; the part remaining unsecured rolls with respect to the secured part. As used herein, rolling means the normal motion of the unsecured part of progressive cavity devices. In so rolling, the shaft and housing form a series of sealed cavities which are 180 degrees apart. As one cavity increases in volume, its counterpart cavity decreases in volume at exactly the same rate. The sum of the two volumes is therefore a constant.

When used as a motor for down hole drilling, the unsecured part or rotor produces a rotor driving motion. The driving motion of the rotor is quite complex in that it is simultaneously rotating and moving transversely with respect to the stator. One complete rotation of the rotor will result in a movement of the rotor from one side of the stator to the other side and back. The true center of the rotor will of course rotate with the rotor. However, in a typical construction, the rotation of the true center of the rotor traces a circle progressing in the opposite direction to the rotation of the rotor, but with the same speed (i.e., reverse orbit). Again, optimum performance is obtained when movement of the rotor is precisely controlled. One complete rotation of the rotor will result in one complete rotation of the true center of the rotor in the opposite direction. Thus, the rotor driving motion is simultaneously a rotation, an oscillation, and a reverse orbit. For multi-lobe motors the reverse orbit is a multiple of the rotational speed, e.g., if a three lobe motor is used the reverse orbit is three times as great as the rotational speed.

Examples of progressive cavity motor and pump devices are well known in the art. The construction and operation of such devices may be readily seen in U.S. Pat. Nos. 3,627,453 to Clark (1971); 2,028,407 to Moineau (1936); 1,892,217 to Moineau (1932) and 4,080,115 to Sims et al. (1978).

Despite the simple construction of progressive cavity devices, use of the devices as motors in driving and drilling apparatus have proven difficult. This difficulty results primarily from the failure to provide a drive train capable of handling the complex rotor driving motion (described above) in a durable, reliable and inexpensive manner. Couplings that connect the rotor of progressive cavity motors with the drill must be capable of operating in a contaminated, hostile environment while handling a very high torque and transmitting the rotational output of the rotor without the orbital motion of the rotor.

Attempts have been made to convert the complex rotor motion into rotational motion for driving a drilling shaft. Of the couplings which have been used in progressive cavity devices, the most commercially successful has been a universal joint attached to the driving end of the rotor and connected to a universal joint attached to the driven drill shaft. As is known, such U-joints react or resolve the orbital motion by the sliding of pin members in a universal assembly. Thus, such joints typically include elements which slide relative to one another.

The principal on which the Hooke's type of universal assembly works is illustrated in FIG. 3. The shaft A is formed into a fork or yoke at its end and pivoted between the prongs of this fork is a cross-piece C. The cross-piece C can therefore pivot about the axis XX relatively to the shaft A. The other shaft B similarly includes a fork or yoke at its end and the other arms of the cross are pivoted between the prongs of this fork. The shaft B can therefore pivot about the axis YY relative to the cross C and, since the latter can pivot about the axis XX relative to the shaft A, the shaft B can assume any angular position relative to shaft A. It follows that if the shafts A and B are supported in bearings with their axes at an angle, then when the shaft A is turned about its axis, the motion is communicated to the shaft B and it turns about its axis; the arms of the cross meanwhile oscillating in the prongs of the forks.

The axes XX and YY intersect at O and are perpendicular to one another. The axes of the arms of the cross C are also perpendicular to their respective shafts. The axes of the shafts A and B also intersect at O, which point is commonly referred to as the "center" of the joint.

Although FIG. 3 shows a specific pivoting connection, it does not matter how the pivoting action is obtained. All that is required is that the shaft B shall be able to pivot independently about two intersecting perpendicular axes such as XX and YY, relatively to shaft A. There are many known constructions for achieving this result.

The single Hooke's type of universal assembly described above suffers from a disadvantage which is obviated in some other forms of the joint. Specifically, when two shafts are connected by a single Hooke's joint and one of these shafts is rotating at an absolutely constant speed, then the other shaft will not rotate at a constant speed but at a speed that is, during two parts of each revolution, slightly greater and, during the other two parts of the revolution, slightly less than the constant speed of the first shaft, i.e., the velocity varies cyclicly. The magnitude of this fluctuation in speed depends on the angle between the axes of the two shafts, being 0 when that angle is 0° but becoming considerable when the angle is large. This disadvantage becomes of practical importance in applications such as downhole drilling when it is important to maintain a constant or substantially constant speed. The disadvantage can be obviated by using two Hooke's joints arranged (as shown in FIGS. 2A and 2B) with an intermediate shaft arranged so that it makes equal angles between the first and second stub shafts and the pivot axes of the intermediate shaft being arranged parallel to each other. The irregularity introduced by one joint is then cancelled out by the equal and opposite irregularity introduced by the second joint.

Past attempts to apply universal joints to downhole motors have suffered from several disadvantages, particularly in the area of reliability. The primary reason for this is that the fluids used in progressive cavity drilling apparatus often are or quickly become abrasive. This abrasive fluid flows between the relative moving (sliding) surfaces of the U-joint causing rapid wear.

In the past, there have been attempts to isolate the sliding pivot surfaces of a universal from contaminants or heavy vibrations. Examples of such constructions are shown in U.S. Pat. No. 2,727,370 to Holland; U.S. Pat. No. 3,262,284 to Maxwell-Holroyd; U.S. Pat. No. 3,545,232 to Neese et al.; and U.S. Pat. No. 4,861,314 to Mazziotti. However, in such known cases there is always sliding between the seal and one of the surfaces of the U-joint components. As a result of this sliding, the seal is not truly hermetic and the U-joint components are not perfectly isolated. Thus, the possibility of contamination exists, particularly in a high pressure application such as down hole drilling.

Another type of universal joint assembly for use in downhole motor drives is disclosed in U.S. Pat. No. 4,772,246 to Wenzel. This patent discloses a pressure equalization arrangement which significantly reduces the pressure differential across the seal. As a result, the likelihood of leakage of drilling mud into the universal joint is reduced. Despite the advantages it offers, this construction is complicated and expensive. Further, the U-joint components are not perfectly isolated because the seal is not hermetic. Consequently, there is some possibility of contamination of the U-joint assembly.

Thus, while the need to seal, to some extent, the components of a U-joint has been recognized, the need to perfectly isolate these components and a reliable means of achieving this are not known in the prior art.

SUMMARY OF THE INVENTION

The present invention obviates the problems associated with known progressive cavity devices by providing a progressive cavity drive train including a progressive cavity device and a hermetically sealed universal joint which converts the complex motion of the rotor into simple rotation of the drill bit drive shaft. The drive train is inexpensive, reliable and durable in comparison to known progressive cavity drive trains.

The present invention also provides an improved drilling apparatus which includes a drill string, a progressive cavity drive train, and a drill bit. The drive train includes a progressive cavity device and a sealed coupling. The progressive cavity device is connected to the lower end of the drill string and includes a stator, a rotor within the stator, and means for flowing fluids through the stator to drive the rotor. The sealed coupling has a first stub shaft, a second stub shaft, an intermediate shaft and a pair of sealed joint assemblies. The first stub shaft has a fork or yoke formed at one end with at least two aligned openings and the second stub shaft also has a similar fork or yoke formed at one end. The intermediate shaft has first and second ends with a yoke formed at each end. The intermediate shaft is coupled, via the joint assemblies, to the first stub shaft at one end and the second stub shaft at the other end. The connection of the shafts via the joint assemblies is such that the coupling functions as a double Hooke's joint. The drill bit has a tubular housing connected to the second end of the second stub shaft for rotation with the second stub shaft. The coupling converts the complex rotor motion into rotational drilling motion about an axis displaced from and parallel to said rotor axis.

The progressive cavity drive train of the present invention can also be viewed as including a housing structure, a stator having a longitudinal axis, a rotor having a true center and being located within the stator, first and second stub shafts and an intermediate shaft coupling the stub shafts through the sealed joint assemblies in a double universal type fashion.

The stator and the rotor have coacting helical lobes in contact with one another at any transverse section. The stator has one more helical lobe than the rotor such that a plurality of cavities are defined between the rotor and the stator. The rotor is adapted to rotate within the stator such that the true center of the rotor orbits the axis of the stator; the orbit has a predetermined radius. The orbit is constant and not subject to change such that the rotor motion can be precisely controlled. The orbit of the rotor causes progression of the cavities in the direction of the axis of the stator.

The first stub shaft has a longitudinal axis and first and second longitudinal ends. The first end of the first stub shaft is connected to and movable with the rotor. The second end of the first stub shaft is formed into a fork or yoke with at least two aligned openings or directly connected to such an assembly or some other joint component.

The second stub shaft has a longitudinal axis which is substantially colinear with the axis of the stator and first and second longitudinal ends. The second stub shaft is supported in the housing so that its longitudinal axis is fixed and the second stub shaft is rotatable about its longitudinal axis. The second end of the second stub shaft is formed into a fork or yoke with at least two aligned openings, or directly connected to such an assembly or some other portion of a joint assembly.

The intermediate shaft member is formed with a fork or yoke at each end or directly connected to such an assembly or some other joint portion. Each fork or yoke has at least two aligned openings. The intermediate shaft is coupled through the joint assemblies to the first stub shaft at one end and the second stub shaft at the other end in the known fashion such that the first, intermediate and second shafts are pivotally connected to one another via the joint assemblies in the manner of a double Hooke's joint.

By virtue of this construction, the first stub shaft can rotate about its axis and orbit about the axis of the second stub shaft at the same time the second stub shaft rotates about its longitudinal axis. In this waY, the complex rotor motion is resolved into simple rotation for driving the drill assembly of a downhole drill.

In addition to the progressive cavity device described in detail above, the drive train of the present invention includes a sealed coupling. The sealed coupling includes the offset stub shafts, the intermediate shaft and the joint assemblies coupling the stub shafts.

In operation, flow of fluids through the stator cavity produces the complex rotor driving motion. The sealed coupling is secured to the end of the rotor projecting from the fluid discharge end of the stator. The coupling converts or resolves the rolling of the rotor into a rotational motion substantially about a single axis at the same speed.

The present inventor has found that a coupling which uses a universal type joint is most reliable when the sliding components of the joint are perfectly isolated from the surrounding environment. Further, the present inventor has discovered that even though there is movement within the coupling, it is possible to perfectly isolate or hermetically seal the U-joint components used in a progressive cavity downhole drilling drive train. In part, the present invention is the result of the present inventor's recognition that universal joints can be designed to resolve the complex motion of a downhole drilling progressive cavity drive train without large angular deviations between adjacent shafts in the universal assembly. In fact, by making the double U-joint assembly of the coupling sufficiently long, the rotor motion can be resolved by a universal joint, the shaft portions of which are typically not skewed by more than 5°. This means that in a coupling for a downhole drilling assembly the amount of movement between the relatively movable portions of the U-joint is normally less than 0.05 inches. It follows that U-joints specifically designed for use in downhole drilling progressive cavity devices do not need to have the flexibility typically required of U-joints. Recognizing this has enabled the present inventor to design a coupling with limited, but sufficient, flexibility and perfectly isolated sliding components.

Thus, the present invention relates to a progressive cavity drive train in which the complex rotor motion is resolved by a U-joint coupling (preferably having U-joints at each end of the coupling) which is modified such that the sliding surfaces within the U-joint are perfectly isolated.

Specifically, in accordance with the present invention, the U-joint is of the type wherein each yoke member has a pivot pin non-rotatably received in the aligned openings. The pin also extends through a cylindrical opening formed in a torsion-type connecting member. If desired, a sleeve may be secured within the opening in the torsion member to define the cylindrical opening through which the pin extends. The pins are pivotable within the opening to allow the required pivoting between the shafts. Each set of shafts is connected by two such transverse pivot pins which are offset longitudinally and disposed transversely. The offset allows the use of larger pins to increase torque capability. The transverse arrangement of the pins ensures the shafts are pivotally connected in the manner of a Hooke's joint.

Further, the exterior dimension of the pin is less than the interior dimension of the cylindrical bore formed in the torsion member such that when the axes of the pin and bore are coincident, an annular space is formed between the pin's exterior surface and the bore's interior surface (which may be defined by a sleeve). A plurality of rollers are located in the annular space between the pin and the hole. The rollers support the pin for movement and transmit torque between coupling components. The spaces between the rollers, pin and hole are filled with an elastomer such as rubber. The elastomer is preferably bonded to both the pivot pin and the inside surface of the bore or sleeve. The elastomer completely fills all such openings so as to perfectly isolate the sliding connection thereby precluding the entry of drilling mud and other abrasives. In operation, the elastomer deforms or stretches to allow movement of the rollers and pin. To facilitate stretching, the elastomer located between the area at which the elastomer is bonded to the pivot pin and the area at which the elastomer is bonded to the inside of the bore of sleeve may be left unbonded. This design significantly extends coupling life.

Thus, the joint assembly includes a pivot pin secured to each of the second end of the first stub shaft, the first end of the second stub shaft and the first and second ends of the intermediate shaft, and a torsion member having two transversely disposed cylindrical bores formed therein. The pins are preferably secured to the shaft yokes by locking pins or the like. Each of the pivot pins extending through one of the cylindrical bores and being spaced from the bores so as to define an annular space between the pin and the bore. A plurality of rollers is located within the annular space so as to provide rolling support for the pins within the bores. The joint assemblies further comprising an elastomer encasing said rollers and substantially filling the annular space. The elastomer is flexible so as to allow pivoting of the stub shafts with respect to the intermediate shaft.

The joint assemblies also can include a sleeve secured within the bore such that the interior surface of the sleeve functions as the interior of the bore. This simplifies assembly of the coupling and makes it possible to use different materials for the torsion member and cylindrical bore.

BRIEF DESCRIPTION OF THE DRAWINGS

Other objects, features, and advantages of the present invention are hereinafter set forth and explained with reference to the drawings wherein.

DETAILED DESCRIPTION OF THE DRAWINGS

Figure 1:
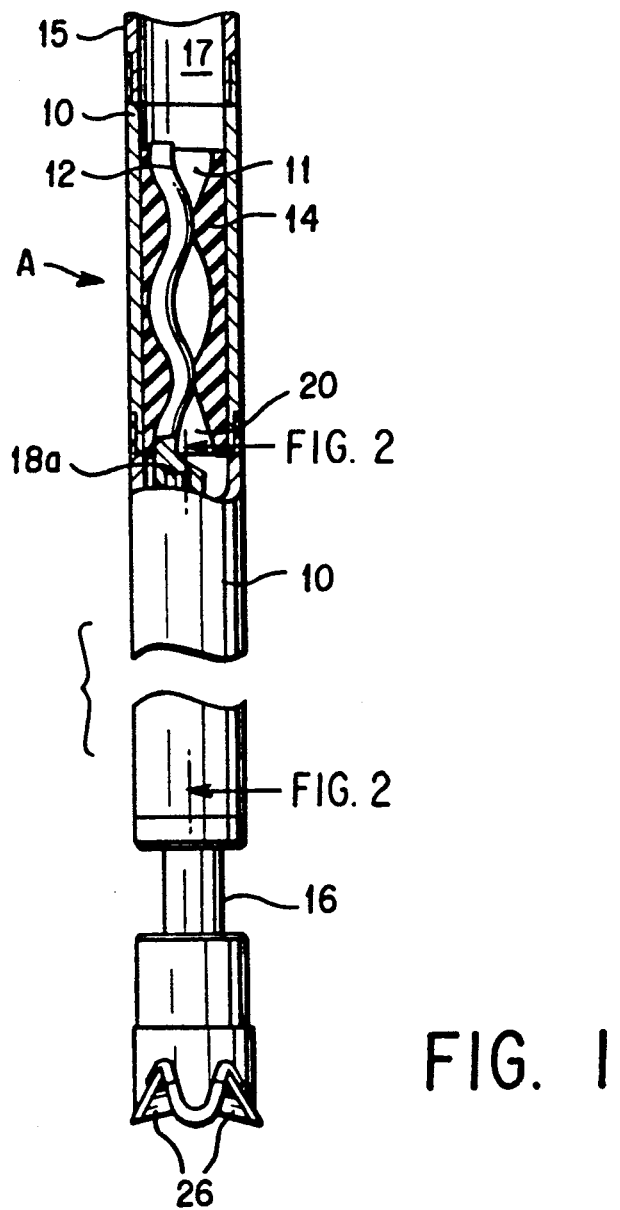
FIG. 1 is an elevation view partly in section of the overall structure of the downhole drilling apparatus of the present invention.
Figure 3:
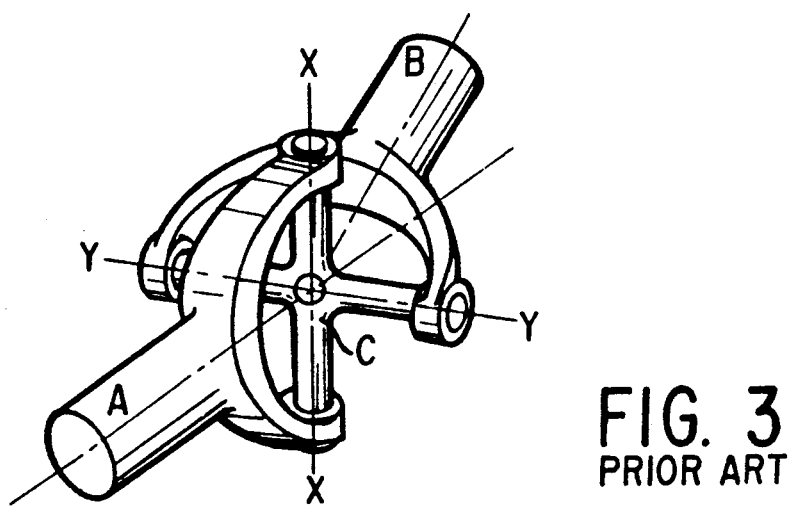
FIG. 3 is a perspective view of a conventional universal joint assembly.

FIG. 1 shows the overall structure of a progressive cavity drilling apparatus using the progressive cavity drive train of the present invention. The apparatus includes a drill string 15, a progressive cavity drive train, a drill bit drive shaft 16 and a drill bit 26. The drive train of the present invention includes a progressive cavity device and a sealed coupling for converting the motion of the rotor of the progressive cavity device, i.e., orbiting of the rotor and the rotational motion of the rotor, into rotation about a single axis at the same speed.

As illustrated in FIG. 1, the progressive cavity device A has a stator, a rotor, a passageway 11 for fluid to enter between the stator and the rotor, and a passageway 20 for the fluid to exit therefrom. In the drawings, the housing 10 and its flexible lining 14 are held against movement so that they function as the stator in the device A and the shaft 12 functions as the rotor. The housing 10 is tubular and its interior communicates with inlet 11 in the top portion of the lining 14 to provide a passageway for fluid to enter the progressive cavity device A. Outlet 20 in the bottom portion of the lining 19 serves as the passageway for fluid to discharge from the progressive cavity device A. The shaft 12 is precisely controlled so as to roll within the lining 14. The progressive cavity device A is attached to the lower end of a drill string 15.

The lower end of the rotor shaft 12 includes a connecting portion 18a. The connecting portion 18a allows the rotor 12 to a complementary connecting portion 18b of a stub shaft of the coupling as described below. The coupling is located in the lower part of the housing 10 and is not visible in FIG. 1. As noted above, one end of the coupling is directly connected, by threading, splining or the like, to the rotor shaft 12. The other end of the coupling is similarly connected to a drill bit drive shaft 16. Typically, the coupling includes separate stub shafts which are connected to the rotor shaft 12 and drive shaft 16 by connecting means such as threads such as 18b or spines and the like. Of course, a stub shaft could be integrally formed connected to either of these shafts, if desired. The drill bit drive shaft 16 is rotatably connected to a conventional drill bit 26.

The progressive cavity drive train of the present invention functions as a fluid motor or driving apparatus for driving the drilling apparatus shown in FIG. 1. Thus, a pressurized fluid, typically water carrying suspended particles commonly referred to as "mud", is forced into the progressive cavity device. The rotor 12 responds to the flowing fluid to produce a rotor driving motion which is simultaneously a rotation, an oscillation, and a orbit. The coupling, described below, attached to the rotor 12 at connection point 18a and aligned with the true center 28 of the rotor described above converts this rotor driving motion into rotational driving motion substantially about a single axis.

Figure 2B:
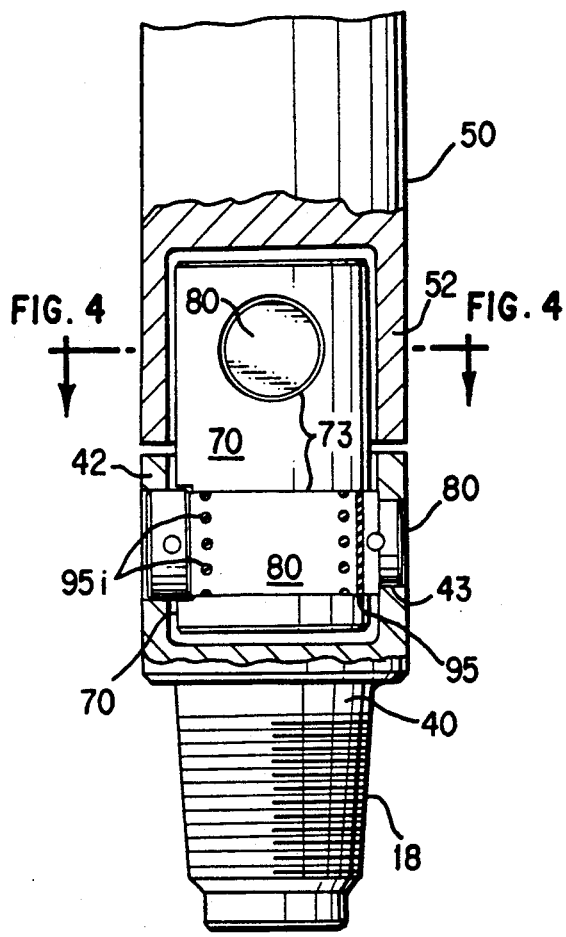
FIG. 2B is a side view of the other part of the sealed coupling.
Figure 2A:
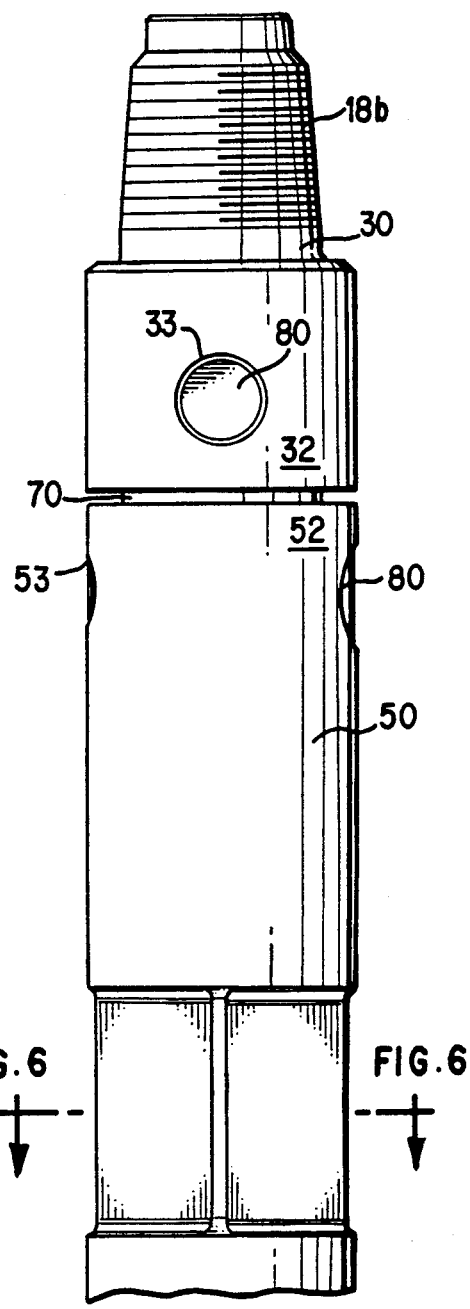
FIG. 2A is a side view, partially in section, of part of the sealed, coupling of the present invention.

FIGS. 2A and 2B show the general construction of the coupling of the present invention. Specifically, the coupling includes a first stub shaft 30, a second stub shaft 40, an intermediate shaft 50 and two torsion members 70. The torsion members 70 are each formed with two transversely extending cylindrical bores 73. Pivot or connecting pins 80 extend through the bores and are non-rotatably connected at their ends to the yokes so as to connect the first stub shaft 30 to the intermediate shaft 50 at one end thereof and connect the second stub shaft 40 to the intermediate shaft 50 at the other end thereof. The torsion member together with the pivot pins 80 and the rollers 90 and elastomer 95 described below form a joint assembly with offset pin portions. However, the joint assembly is not rigid since the pin portions are designed to be non-rotatably connected to the yoke members and are pivotable with respect to the torsion member.

The stub shafts 30, 40 each include a connecting portion 18b which allows the stub shafts to be connected to either the rotor 12 or the drill bit drive shaft 16 in the manner described above. Although a specific connecting means is shown, i.e., threads on the end of the stub shaft, other connecting means such as splines or the like, could be employed. Additionally, as mentioned above, the stub shafts could be formed integrally with either the rotor shaft 12 or the drill bit drive shaft 16.

As detailed below, the connection of the aforementioned components of the coupling member is similar to that of a conventional double Hooke's joint universal. Specifically, the stub shafts 30, 40 each include a yoke 32, 42, respectively, at one end thereof. The yokes 32, 42 include at least two aligned openings 33, 43 for receiving the pivot pins which extend through torsion members. Likewise, the intermediate shaft 50 has a yoke 52 formed at each end thereof. Each yoke includes at least two aligned openings 53. Pivot pins 80 transversely arranged and extending through torsion members 70 are secured within the aligned openings by locking pins 82.

Figure 4:
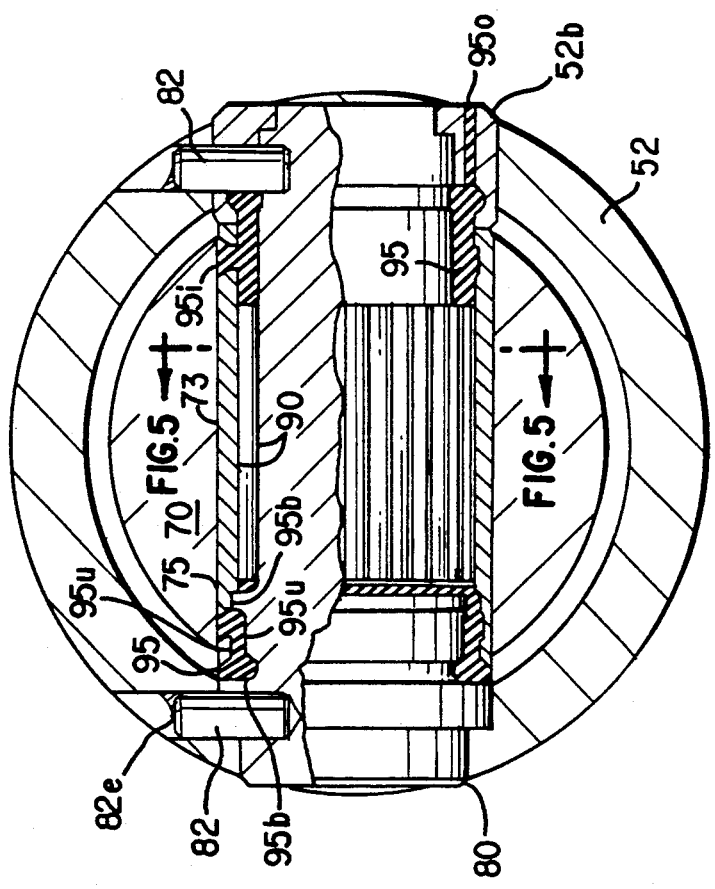
FIG. 4 is a section view, partially cut away, along the lines indicated in FIG. 2.

In the illustrated embodiment, the torsion member 70 located between the first stub shaft 30 and the intermediate shaft 50 is identical to the torsion member 70 located between the second stub shaft 40 and the intermediate shaft 50. Each torsion member 70 is shaped to extend into the opposed yokes of the stub shaft and the intermediate shaft as shown in FIGS. 2A and 2B. The torsion members 70 include two cylindrical bores which are transversely disposed as shown in FIG. 2B. The cylindrical bores 73 are adapted to receive pivot pins 80. As best shown in FIG. 4, the pivot pins 80 extend through the cylindrical bores 73 and into the opposed openings of each yoke 32, 42, 52. The ends of the pins 80 are secured within the openings 33, 43, 53 by a locking pins 82, or the like.

The locking pins 82 rotatably secure the pivot pins 80 to the yoke portions of their respective shafts. By virtue of this connection and the fact that the pivot pins 80 extend through the bores 73 and the torsion member 70, the shafts are pivotable with respect to the torsion members. Further, by virtue of the alternating transverse alignment of the openings and thus the alternating transverse arrangement of the pins, the shafts 30, 40, and 50 are coupled to one another through the torsion members 70 in the manner of a double Hooke's joint.

As can be readily appreciated from the above description, in the universal assembly of the present invention, there is relative movement between the surface of the pivot pin 80 and the surface of the cylindrical bores 73 formed in the torsion members 70.

As shown in FIG. 4, to simplify assembly or reduce cost, a cylindrical sleeve 75 may be bonded or otherwise secured at its outer periphery to the cylindrical bore 73. This can simplify assembly as described below. Additionally, the provision of the sleeve can provide a bore surface of a high performance material. Of course, if the torsion member 70 is formed of a sufficiently high performance material, or for some other reason, a separate sleeve is not necessary the sleeve 75 can be omitted. If, as in the illustrated embodiment, a separate sleeve is provided, the inside surface of the sleeve functions as a cylindrical bore. Thus, there is relative movement between the bore-like inside surface of the sleeve 75 and the pivot pin 80.

As previously explained, because of the need to prevent the entry of abrasive material between these two sliding surfaces, it is important to isolate these sliding surfaces from the surrounding environment. In accordance with the present invention, this is achieved through the use of an elastomer encased roller assembly. Specifically, the cylindrical bores 73 formed in the torsion member 70 are larger than the outside diameter of the connecting pins 80. Thus, when the axes of the cylindrical bore 73 (or sleeve 75, if provided) and the connecting pin 80 are coincident, there remains an annular space between the outer periphery of the locking pins and the surface of the cylindrical bore 73 or the inside surface of the sleeve 75.

Figure 5:
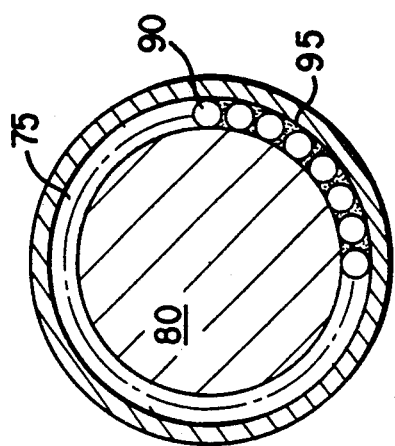
FIG. 5 is a section view along the lines indicated in FIG. 4.

As best shown in FIGS. 4 and 5, a plurality of cylindrical rollers 90 circumferentially surround the pivot pin 80 and extend between the pin 80 and the interior of the cylindrical bore 73 of the torsion member 70. The cylindrical rollers 90 are preferably formed of some high performance high strength material such as steel. Thus, the cylindrical rollers 90 provide a solid contact between the pins 80 and the torsion member 70 for the transmission of torque. The rollers also support the pin for movement within the cylindrical bore 73.

To perfectly isolate the assembly, an elastomer 95 completely fills all the openings between adjacent rollers and 15 between the rollers and the pivot pin 80 and the rollers and the torsion member 70. Further, as best seen in FIG. 4, the rollers 90 extend only partially across the length of the pivot pin 80 and the elastomer 95 fills the remaining portion of the annular space between the pivot pin 80 and the torsion member 70. Thus, the elastomer completely fills all openings between the moving parts of the coupling so as to perfectly isolate the sliding surfaces and preclude the entry of drilling mud and other abrasives.

Preferably the elastomer is bonded to the pivot pin 80 and the inside of the sleeve 75 at least at the ends of the elastomer filled assembly. For example, the elastomer is bonded to the pin and sleeve at regions 95b in FIG. 4. This ensures a hermetic seal between the pivot pin 80 and the sleeve 75. However, in order to facilitate stretching of the elastomer to accommodate movement between the pin 80 and sleeve 75, the elastomer is not bonded, i.e., left unbonded, at a region 95u between the bonded regions 95b. The unbonded regions stretch more easily.

In operation, the elastomer 95 deforms or stretches to allow sufficient movement of the rollers 90 and pins 80 such that the coupling can obtain the 5° of angular deviation necessary to resolve the complex rotor movement into simple rotation of the drill bit drive shaft 16.

Figure 6:
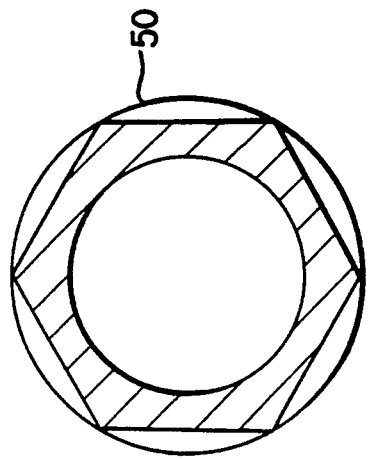
FIG. 6 is a section view along the lines indicated in FIG. 2.

As shown in FIG. 6 the body of the coupling may include a flattened portion to allow rotation of the coupling, with a hex wrench or the like, to screw the connecting portions 18b into a complementary connecting portion such as 18a.

The illustrated coupling is preferably assembled with the use of a separate sleeve 75 spaced from the locking pin 80 to form an annular space between the cylindrical inner surface of the sleeve 75 and the outer surface of the locking pins. The rollers are positioned within this annular space. After the rollers 90, locking pins 80 and sleeve 75 are assembled, elastomer 95 is injected through elastomer injection openings 95o so as to completely fill all voids in the assembled structure. The elastomer 95 flows into interlock openings 95i so as to form a mechanical interlock with the sleeve 75. The exterior surface of the cylindrical sleeve 75 is then bonded to the interior of the cylindrical bore 73 of the torsion member 70 using epoxy or the like such that the cylindrical sleeve 75 functions as a part of the torsion member 70. Thus, the inner surface of the sleeve 75 becomes, in effect, the cylindrical bore 73.

As mentioned above, two such locking pin, roller and sleeve assemblies are located in each torsion member 70. The two locking pins are transversely arranged as best seen FIGS. 2A and 2B. In this assembled state, the torsion member with the two locking pin, roller and sleeve assemblies secured therein functions as a sealed joint assembly with flexible pin extensions. The pin extensions i.e. the connecting pins 80 are then rotatably secured to the yoke members of the shafts by locking pins 82. The locking pins 82 may be secured in place by epoxy 82e at the end thereof. In the illustrated embodiment, one end of the pin 80 is received in a separate yoke bushing 52b. It is known that the use of such a bushing simplifies assembly in some cases.

What is claimed is:

1. A progressive cavity drive train comprising:
   a housing structure;
   a stator, the stator having a longitudinal axis;
   a rotor having a true center, the rotor being located within the stator;
   the stator and the rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit having a predetermined radius and the orbit causing a progression of the cavities in the direction of the axis of the stator;
   a first stub shaft having a longitudinal axis and first and second longitudinal ends, the first end of the first stub shaft being connected to and movable with the rotor, the second end of the first stub shaft comprising a yoke;
   a second stub shaft having first and second longitudinal ends and a longitudinal axis which is substantially colinear with the axis of the stator, the second stub shaft being rotatably mounted about its longitudinal axis within the housing structure, the second end of the second stub shaft comprising a yoke;
   a sealed universal joint assembly coupling the yoke formed on the first stub shaft to the yoke formed on the second stub shaft, the sealed universal joint including at least two transverse cylindrical bores and one cylindrical pivot pin extending through each of the cylindrical bores such that an annular space is formed between the outer surface of each of the cylindrical pivot pin and the inner surface of the cylindrical bore through which it extends, a plurality of rollers provided in the annular space and an elastomer encasing the rollers and substantially filling the annular space so as to isolate the rollers from the universal joint's environment; and
   whereby the sealed universal joint couples the first and second stub shafts such that the first stub shaft can rotate about its axis and orbit about the axis of the second stub shaft at the same time the second stub shaft rotates about its longitudinal axis.

2. The progressive cavity drive train of claim wherein the first stub shaft is integrally connected with the rotor.

3. The progressive cavity drive train of claim 1, wherein the first stub shaft is connected to the rotor by a threaded coupling.

4. The progressive cavity drive train of claim 1, wherein the second stub shaft is rotatably supported in the housing structure by bearings.

5. The progressive cavity drive train of claim 1, further comprising a rotatable shaft rotatably mounted in the housing structure by bearings, the second stub shaft being secured to the rotatable shaft.

6. The progressive cavity drive train of claim 1, further comprising a drill bit operatively connected to and driven by the second stub shaft.

7. A drilling apparatus comprising:
   a drill string;
   a progressive cavity device connected to the lower end of the drill string, the progressive cavity device comprising a stator having a longitudinal axis, a rotor within the stator, the rotor having a true center, and a passageway for flowing fluids through the stator to drive the rotor as so to cause the true center of the rotor to rotate and orbit about the axis of the stator;

a sealed coupling having first and second ends, a first stub shaft at the first end and a second stub shaft at the second end, the first stub shaft having a yoke formed at one end and the second stub shaft having a similar yoke formed at an end thereof, a sealed joint assembly including at least two pivot pins and at least one torsion member, one of the pivot pins being fixed to the yoke formed on the first stub shaft and another of the pivot pins being fixed to the yoke formed on the second stub shaft such that the first and second stub shafts are connected to one another through the joint assembly, each torsion member having at least two cylindrical bores formed therein, the two cylindrical bores being transverse to one another and each of the pivot pins extending through one of the cylindrical bores formed in a torsion member and spaced from the bore such that an annular space is formed between the pivot pin and the bore, a plurality of rollers provided in the annular space and an elastomer encasing the rollers and substantially filling the annular space so that the annular space and rollers are isolated from the environment of the joint assembly;

wherein the first stub shaft of the sealed coupling is attached to the rotor and has its axis aligned with the true center of the rotor for rotation therewith; and a drill bit drive shaft connected to the second stub shaft of the sealed coupling so as to rotate with the second stub shaft;

whereby the sealed coupling converts rotor orbiting and rotation into rotational motion of the drill bit drive shaft about an axis displaced from and parallel to said rotor axis.

8. A progressive cavity drive train for use in a downhole drilling apparatus, the progressive cavity drive train comprising:

a housing structure;

a stator, the stator having a longitudinal axis;

a rotor having a true center, the rotor being located within the stator; the stator and rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit causing a progression of the cavities in the direction of the axis of the stator;

a first stub shaft having first and second longitudinal ends, the first stub shaft being secured at the first longitudinal end thereof to the rotor for movement therewith;

a first joint assembly having first and second longitudinal ends, the longitudinal ends of the first joint assembly being pivotable with respect to one another about two transversely arranged axes and the first longitudinal end of the joint assembly being secured to the first stub shaft for movement therewith;

an intermediate shaft having first and second longitudinal ends, the first longitudinal end of the intermediate shaft being secured to the second longitudinal end of the first joint assembly for movement therewith, the first joint assembly thereby connecting the first stub shaft to the intermediate shaft for pivotable movement about the aforesaid two axes;

a second joint assembly having first and second longitudinal ends, the first and second longitudinal ends of the joint assembly being pivotable with respect to one another about two axes, the first longitudinal end of the joint assembly being secured to the second longitudinal end of the intermediate shaft for movement therewith;

a second stub shaft having first and second longitudinal ends, the first longitudinal end of the second stub shaft being connected to the second longitudinal end of the second joint assembly for movement therewith such that the second joint assembly connects the intermediate shaft to the second stub shaft for pivoting movement about the aforesaid two axes;

a drill bit drive shaft, the drill bit drive shaft being mounted for rotation about a predetermined axis and being operatively connected to the drill bit of the downhole drilling assembly for driving the drill bit, the drill bit drive shaft having first and second longitudinal ends, the first longitudinal end of the drill bit drive shaft being secured for movement with the second stub shaft so as to rotate therewith;

wherein the first joint assembly includes at least three portions which are movable with respect to one another and wherein the surfaces of these portions which move with respect to one another are encased in elastomer so as to be perfectly isolated from the surrounding environment so as to preclude the entry of abrasives; and wherein the second joint assembly includes at least three portions which are movable with respect to one another and wherein the surfaces of the portions which are movable relative to one another are encased in elastomer so as to be perfectly isolated from the surrounding environment so as to preclude the entry of abrasives.

9. A progressive cavity drive train for driving a downhole drill bit drive shaft about a single axis, the progressive cavity drive train comprising:

a housing structure;

a stator, the stator having a longitudinal axis;

a rotor having a true center, the rotor being located within the stator; the stator and rotor being arranged with respect to one another such that a plurality of cavities are defined between the rotor and the stator and the rotor being adapted to rotate within the stator such that the cavities between the rotor and stator progress in the direction of the axis of the stator;

a drill bit drive shaft mounted within the housing for rotation about a predetermined axis, the drill bit drive shaft having first and second longitudinal ends, the second longitudinal end being operatively connected to a drill bit for causing rotation of the drill bit about a predetermined axis;

a flexible coupling having first and second longitudinal ends, the first longitudinal end of the flexible coupling being connected to the rotor and the second longitudinal end of the flexible coupling being connected to the first end of the drill bit drive shaft, the flexible coupling comprising a first stub shaft having first and second longitudinal ends, a second stub shaft having first and second longitudinal ends and an intermediate shaft having first and second longitudinal ends, the second longitudinal end of the first stub shaft being pivotably connected to the first longitudinal end of the intermediate shaft and the first longitudinal end of the second stub shaft being pivotably connected to the second longitudinal end of the intermediate shaft for movement about two transversely disposed axes; and wherein the pivotable connection between the first stub shaft and the intermediate shaft and the second stub shaft and the intermediate shaft is provided by a joint assembly which includes a pivot pin secured to each of the second end of the first stub shaft, the first end of the second stub shaft and the first and second ends of the intermediate shaft, and a torsion member having two transversely disposed cylindrical bores formed therein, each of the pivot pins extending through one of the cylindrical bores and being spaced from the bores so as to define an annular space between the pin and the bore, a plurality of rollers located within the annular space so as to provide rolling support for the pins within the bores, the joint assemblies further comprising an elastomer encasing said rollers and substantially filling the annular space, the elastomer being flexible so as to allow pivoting of the stub shafts with respect to the intermediate shaft.

10. A progressive cavity drive train for causing rotation of a drill bit drive shaft about a single axis, the progressive cavity drive train comprising:
a housing structure;
a stator, the stator having a longitudinal axis;
a rotor having a true center, the rotor being located within the stator; the stator and the rotor each having coacting helical lobes which are in contact with one another at any transverse section, the stator having one more helical lobe than the rotor such that a plurality of cavities are defined between the rotor and the stator, and the rotor being adapted to rotate within the stator such that the true center of the rotor orbits the axis of the stator, the orbit having a predetermined radius and the orbit causing a progression of cavities in the direction of the axis of the stator;
a first stub shaft having a longitudinal axis and first and second longitudinal ends, the first end of the first stub shaft being connected to and movable with the rotor, the second end of the first stub shaft comprising a yoke member;
an intermediate shaft, the intermediate shaft having first and second longitudinal ends, a yoke member formed on each of the ends of the intermediate shaft, a torsion member extending between the yoke formed on the intermediate shaft and the yoke formed on the first stub shaft, the torsion member having two transversely extending bores formed therein, and a plurality of pivot pins each of the pivot pins extending through one of the bores, and being fixed to one of the yoke members;
a plurality of circumferentially spaced rollers supporting the pins within the bores and an elastomer extending between the pins and the bore and encasing the plurality of rollers;
a second stub shaft having a longitudinal axis which is substantially colinear with the axis of the stator and first and second longitudinal ends, the second stub shaft being rotatably mounted about its longitudinal axis within the housing structure, the second end of the second stub shaft being operatively connected to the drill bit drive shaft for rotating the drill bit drive shaft about a predetermined axis, the first end of the second stub shaft being formed with a yoke member,
a torsion member extending between the yoke member formed on the second stub shaft and the yoke member formed on the second end of the intermediate shaft the torsion member having two transversely extending bores formed therein, and a plurality of pivot pins each of the pivot pins being fixed to one of the yoke members and extending through and being spaced from one of the bores so as to pivotally connect the yoke member to the torsion member, a plurality of rollers supporting the pivot pins within the bores and an elastomer encasing the rollers and extending between the pivot pins and bore so as to isolate the rollers from the environment of the coupling such that all moving parts of the coupling are perfectly isolated from the surrounding environment.

11. The progressive cavity drive train of claim 10, wherein the first stub shaft is integral with the rotor.

12. The progressive cavity drive train of claim 10, wherein the second stub shaft is integral with the drill bit drive shaft.

* * * * *